United States Patent
Sheridan et al.

(10) Patent No.: US 10,553,001 B2
(45) Date of Patent: Feb. 4, 2020

(54) MASTER PAGE OVERLAY

(75) Inventors: Shawn C. Sheridan, Bellevue, WA (US); Michael A. Ninness, Bellevue, WA (US)

(73) Assignee: Adobe Inc., San Jose, CA (US)

( * ) Notice: Subject to any disclaimer, the term of this patent is extended or adjusted under 35 U.S.C. 154(b) by 1101 days.

(21) Appl. No.: 12/623,188

(22) Filed: Nov. 20, 2009

(65) Prior Publication Data
US 2014/0033026 A1   Jan. 30, 2014

(51) Int. Cl.
*G06F 3/048* (2013.01)
*G06F 17/00* (2019.01)
*G06T 11/60* (2006.01)

(52) U.S. Cl.
CPC .............. *G06T 11/60* (2013.01); *G06F 3/048* (2013.01); *G06F 17/00* (2013.01)

(58) Field of Classification Search
CPC ...... G06F 17/21; G06F 17/248; G06F 17/211; G06F 3/0481; G06F 17/2247; G06F 17/227; G06F 17/30607; G06F 3/1293; G06F 2217/04; G06F 3/048; G06F 17/00; G06T 11/60
USPC .......................... 715/243, 249, 236; 358/1.15
See application file for complete search history.

(56) References Cited

U.S. PATENT DOCUMENTS

| | | | |
|---|---|---|---|
| 5,581,670 A * | 12/1996 | Bier et al. | 715/856 |
| 6,144,974 A * | 11/2000 | Gartland | 715/205 |
| 6,330,071 B1 * | 12/2001 | Vidyanand | 358/1.15 |
| 6,813,746 B1 * | 11/2004 | O'Shea | 715/234 |
| 7,389,471 B2 * | 6/2008 | Croney et al. | 715/209 |
| 7,467,351 B1 * | 12/2008 | Spells | G06F 17/211 715/243 |
| 2003/0058457 A1 * | 3/2003 | Fredlund et al. | 358/1.2 |
| 2004/0125148 A1 * | 7/2004 | Pea et al. | 345/802 |
| 2004/0236640 A1 * | 11/2004 | Kassan | 705/27 |
| 2004/0239982 A1 * | 12/2004 | Gignac | 358/1.15 |
| 2006/0250621 A1 * | 11/2006 | Cochran et al. | 358/1.2 |
| 2006/0259858 A1 * | 11/2006 | Collins | G06F 17/211 715/243 |
| 2006/0259875 A1 * | 11/2006 | Collins | G06F 17/212 715/853 |

(Continued)

OTHER PUBLICATIONS

Page Control 2.2 Supports CS4, Adds Features, published Dec. 17, 2008 by CreaivePro.com, pp. 1-3.*

(Continued)

*Primary Examiner* — Stephen S Hong
*Assistant Examiner* — Ahamed I Nazar
(74) *Attorney, Agent, or Firm* — Shook, Hardy & Bacon, LLP

(57) ABSTRACT

In an example embodiment, a system and method to provide a master page overlay is provided. The example method may comprise receiving a transformation of a master page where the transformation is associated with a page layout, applying the transformation to the master page, and outputting the page layout, where the page layout incorporates graphical elements from the transformed master page. The system and method may further include providing an interface to receive instructions from a user to display a master page overlay, display the master page overlay, and receive the transformation of the master page associated with the page layout.

20 Claims, 9 Drawing Sheets

(56) References Cited

U.S. PATENT DOCUMENTS

| | | | | |
|---|---|---|---|---|
| 2006/0265659 | A1* | 11/2006 | Collins | G06F 17/211 |
| | | | | 715/732 |
| 2006/0282779 | A1* | 12/2006 | Collins | G06F 17/248 |
| | | | | 715/732 |
| 2007/0133067 | A1* | 6/2007 | Garg | 358/462 |
| 2008/0010583 | A1* | 1/2008 | Lee | 715/200 |
| 2008/0141116 | A1* | 6/2008 | Mohan | 715/236 |
| 2009/0307123 | A1* | 12/2009 | Gershon | 705/37 |
| 2011/0109730 | A1* | 5/2011 | Aubey et al. | 348/51 |

OTHER PUBLICATIONS

Agarwal_Calling JavaScript from ASP-NET Master Page and Content Pages—Part 2_Feb. 18, 2009, pp. 1-6. (Year: 2009).*

PDF Overlay—Stitching PDF Pages Together_Sep. 2007, pp. 1-4. (Year: 2007).*

Johnson "Managing Pages and Books in Adobe InDesign CS4", published Feb. 5, 2009, pp. 1-21. (Year: 2009).*

Microsoft PowerPoint 2003 Student Edition Complete, pp. 1-221. (Year: 2003).*

\* cited by examiner

MASTER PAGE OVERLAY

TECHNICAL FIELD

The present application relates generally to the technical field of rendering images on a display and, in one specific example, to manipulation of a master page.

BACKGROUND

A page layout generally includes multiple objects. These objects may include texts, images, other objects, or any combination of the above. In some instances, a user may wish to reuse certain objects on more than one page. To do so, the user often applies a master page to one or more pages.

BRIEF DESCRIPTION OF THE DRAWINGS

Some embodiments are illustrated by way of example and not limitation in the figures of the accompanying drawings in which.

DETAILED DESCRIPTION

Figure 1:
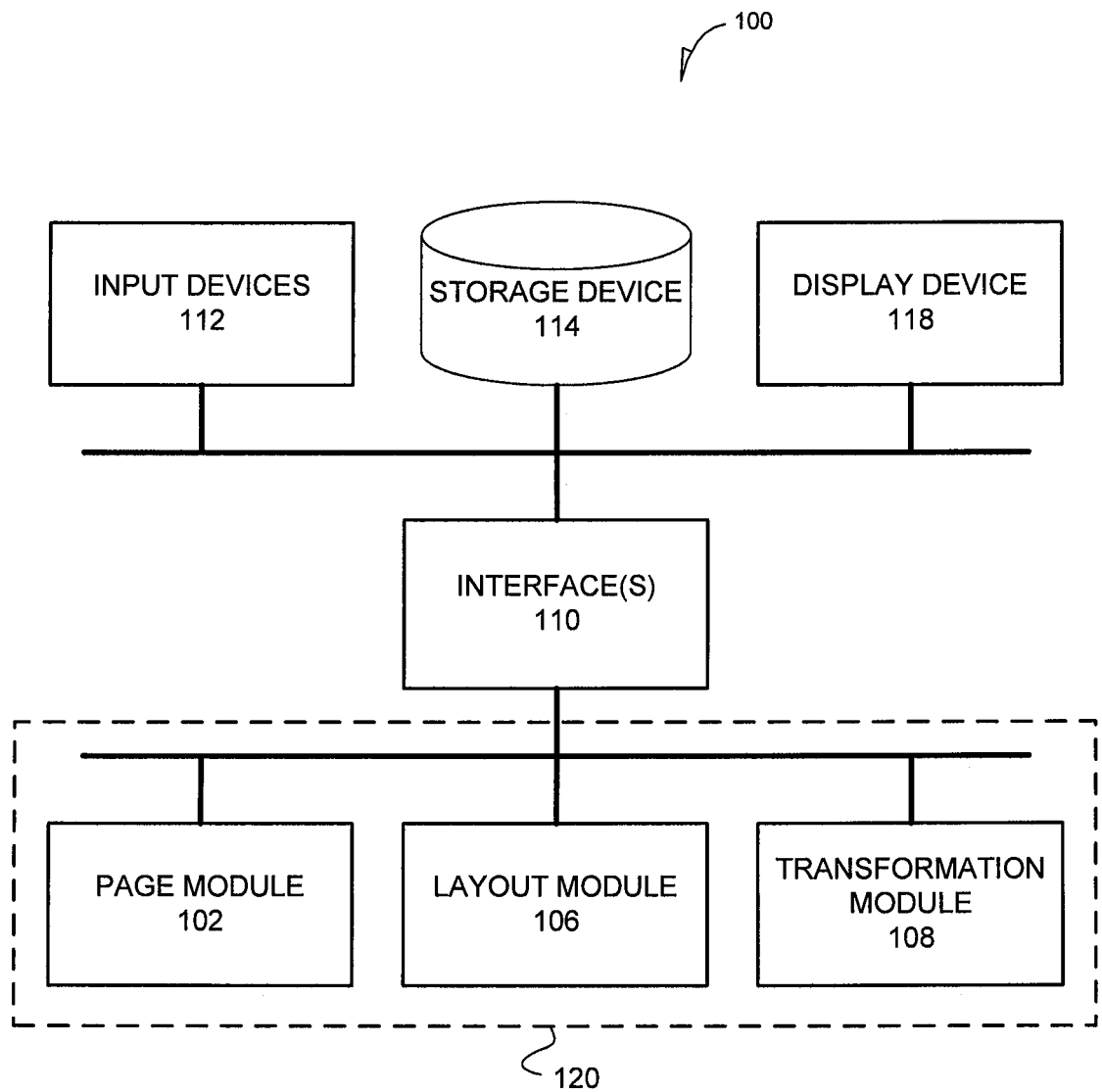
FIG. 1 is a block diagram illustrating a system to manipulate a master page, according to various embodiments.

In various example embodiments, methods and systems to provide a master page overlay are disclosed. In the following description, for purposes of explanation, numerous specific details are set forth in order to provide a thorough understanding of an example embodiment of the present invention. It may be evident, however, to one skilled in the art that the present invention will be practiced without these specific details.

In various example embodiments, systems and methods are shown that allow a user to apply a master page to a layout such as a page layout and thereby allow the layout to incorporate graphical elements from the master page. Various embodiments may involve having a graphical user interface to display a master page overlay that represents a master page to a user. The master page overlay enables a user to manipulate, alter, and transform a manner in which the master page is applied to the layout. For example, a user can use the master page overlay to shift a position of the master page, resize the master page, rotate the master page, or make any other change to the master page as it is applied to each layout. A user can also use scripts written in a scripting language to alter a way a master page is applied to the layout. Changes in the way the master page is applied to the layout may sometimes be referred to as a "transformation."

A layout may be any organization or positioning of graphical elements in a space. For example, layouts are often used in areas where the organization and positioning of graphical elements is important, such as on a page (e.g., a digital page, web pages, newspaper pages, posters, and magazine pages), image, or other document. Each layout is sometimes referred to as a "page layout" or "page." A layout may include various graphical elements, sometimes referred to as "graphical items." These graphical elements may include layout elements, content elements, or any other page layout data. Examples of graphical elements include borders, headers, footers, frames, images/graphics, text objects, shape objects, effect objects, imported file objects, custom objects, etc.

A user may wish to use a graphical element on more than one page layout. This is one scenario in which a user may apply a master page that includes graphical elements to one or more page layouts (sometimes referred to as "real document pages"). When a master page is applied to a page layout, the page layout may incorporate or inherit graphical elements included in the master page such that the output of the page layout may include graphical elements included in the master page. In some embodiments, more than one master page may be applied to the page layout or the master page may be applied to another master page.

The master page is a layout concept that enables a user to reuse certain graphical elements. The master pages may be used for headers and footers of documents, watermarking, templates for documents, document forms, layers, letterhead, or any other scenario in which a user wishes to be able to use a graphical element or a version of the graphical element in more than one page layout.

In one embodiment, the master page may be applied to the page layout at a default position. In one example embodiment where the dimensions of the master page and the dimensions of the page layout are the same, the master page is applied entirely on the page layout. In other words, if a graphical element is shown at coordinate $(x_1, y_1)$ of the master page, the graphical element will also be incorporated into the page layout at coordinate $(x_1, y_1)$.

However, there are several circumstances where a default position, wherever it may be, may be inadequate. Examples where the default position may be inadequate may include a situation where the dimensions of the page layout and the dimensions of the master page are different, or a situation where a user may wish to manipulate application of the master page (and therefore graphic elements in the master page) to the page layout in some way. As a result, in various embodiments, the master page overlay may be activated to enable a user to manipulate or transform the master page or the graphical elements of the master page with respect to each page layout.

The master page overlay may provide a user with an interface to communicate transformation instructions or transformation data to a layout system. The layout system may then use the transformation instructions or transformation data to apply a transformation to a master page and output the page layout, wherein the page layout incorporates the transformed master page. In one embodiment, manipulation and transformation of the master page with respect to the page layout provides a user with flexibility in using the master pages, and provides a wider range of uses for the master pages.

The master page overlay may comprise one or more graphical objects that represent the master page. The master page overlay allows a user to view the graphical elements included in the master page in a way that the user may distinguish which graphical elements are included in the master page and which graphical elements are included in the page layout. In one embodiment, a user is also allowed to interact with and manipulate the master page overlay. Transformation instructions or transformation data for the master page may be determined based on the user interactions and manipulations of the master page overlay.

In example embodiments, a transformation encompasses one or more functions that represent manipulations of the master page. For example, the master page may be lengthened, widened, or resized in any other manner, moved or shifted along one or more axes, rotated, skewed, sheared, flipped, or reflected along an axis, folded, etc. The color, hue, saturation, or texture of one or more graphical elements in the master page may also be altered. Additionally, the transformation may include a combination of changes to the master page. In one embodiment, an affine transformation may be used to describe the manipulations of a master page. In another embodiment, a perspective transformation may be used.

FIG. 1 is a block diagram illustrating a system 100 to manipulate a master page, according to example embodiments. The system 100 may include a page module 102, a layout module 106, and a transformation module 108, one or more interfaces 110, one or more input devices 112, a storage device 114, and a display device 118. In one embodiment, the page module 102, the layout module 106, and the transformation module 108 may be included in a layout engine 120. The storage device 114, such as a database or other memory device, may be used to store page layouts and master pages. In one embodiment, the storage device 114 may also be used to store transformation instructions.

These page layouts and master pages may be stored or retrieved via one of the interfaces 110 and edited or manipulated. The page layouts and master pages may be outputted or displayed using the display device 118. One or more of the interfaces 110 may also be used to receive data or signals from one or more input devices 112 such as a mouse, keyboard, touchpad, trackball, tablet and digital pen, touch screen, communications device, or any other device used in creating and manipulating layouts. Furthermore, one or more of the interfaces 110 may be used to receive transformation instructions for a master page associated with a page layout, for example, from one of the input devices 112 or the storage device 114.

The page module 102 may be used to associate a master page with a page layout, or transformation instructions for the master page with one or more page layouts. For example, the page module 102 may associate a page data object containing page layout data with a reference to one or more master pages, or associate a page data object with transformation instructions for the master pages.

The transformation module 108 may apply a transformation associated with the transformation instructions to the master page and apply the transformed master page to a page layout so that the layout module 106 may display the page layout on the display device 118 via one of the interfaces 110. Even though some embodiments will refer to outputting the page or page layout to the display device 118, pages or page layouts may also be outputted to other devices (e.g., such as storage devices, printers, and web servers) using the interfaces 110.

Figure 2A:
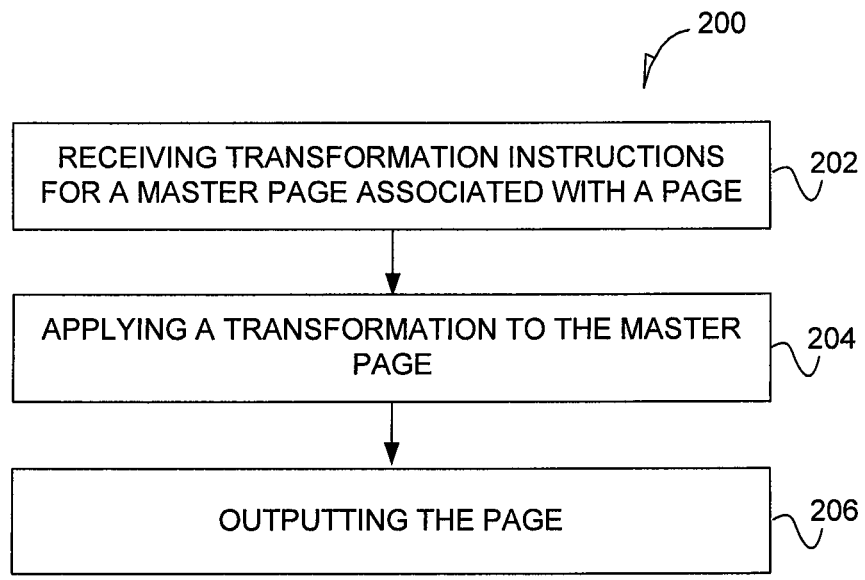
FIG. 2A is a flow diagram illustrating a method to manipulate a master page, in accordance with one example embodiment.

FIG. 2A is a flow diagram illustrating a method 200 to manipulate a master page, in accordance with one example embodiment. At operation 202, an interface may receive transformation instructions for the master page associated with a page layout. In one embodiment, the transformation instructions may be received as a file or a script from a memory device such as storage device 114, an input device 112, over the Internet via a network card, etc. In another embodiment, receiving transformation instructions for the master page associated with the page layout involves accessing a page data object, wherein the page data object includes page layout information and transformation data associated with the page layout.

At operation 204, the transformation module 108 may apply the transformation instructions to the master page. In one embodiment, the transformation module 108 applies the transformation instructions by performing the functions or steps in the file or script received at operation 202. In another embodiment, the transformation module may access the page data object to obtain the transformation data associated with the page data object and transform the master page based on the transformation data.

The page layout is then outputted by the layout module 106 at operation 206, the outputted page layout incorporating one or more graphical elements from the transformed master page. For example, the layout module 106 may output the page layout to the display device 118 via a display interface, a printer via a printer interface, to another computer or machine via a network interface, or to a memory device such as the storage device 114. In one embodiment, the transformed master page is stored in a separate memory from the memory storing the master page. In another embodiment, the transformation instructions are stored in a page data object instead.

Figure 2B:
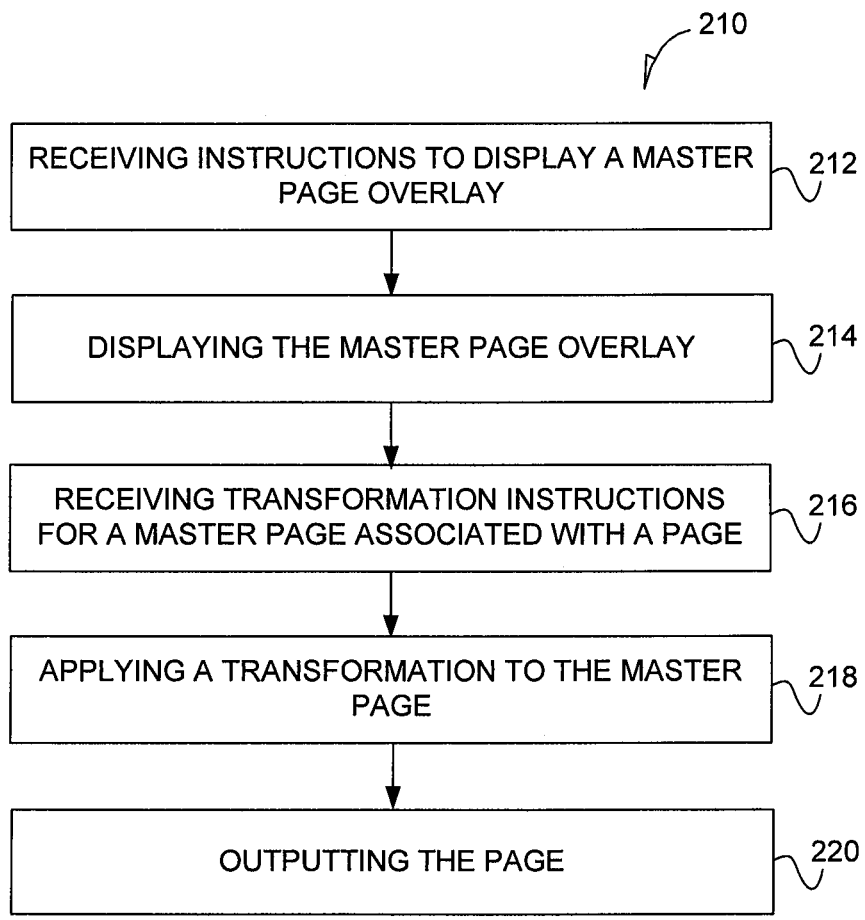
FIG. 2B is another flow diagram illustrating a method to manipulate a master page, in accordance with one example embodiment.

According to various embodiments, the layout module 106 may provide a graphical user interface to receive instructions and transformation data from a user via an input device 112. For example, FIG. 2B is another flow diagram illustrating a method 210 to manipulate the master page, in accordance with one example embodiment. In the embodiment of FIG. 2B, a graphical user interface may be provided to a user to enable the display and manipulation of the master page overlay.

At operation 212, the graphical user interface displaying the page layout may receive instructions from a user to display the master page overlay associated with the page layout. For example, in a design application or page layout application, a user working on the page layout may be presented with a button or command to enable the display of the master page overlay. A user wishing to change the application of the master page to the page layout may activate the button or command.

At operation 214, in response to receiving an activation of the button or command, the graphical user interface may display the master page overlay. In one embodiment, the graphical user interface displays the master page overlay over its associated page layout at a position that corresponds to a default position.

A user may interact with the master page overlay to generate transformation instructions for the master page. For example, a user may drag and drop the master page overlay, resize the master page overlay, rotate the master page overlay, or apply other changes to the master page overlay using buttons, menu commands, tool palettes, etc. The user may also use a graphical user interface to select a script comprising transformation data or transformation instructions. The script may then be applied to the master page. Custom scripts may also be generated and applied to the master page. Changes to, and manipulations of, the master page overlay may be detected and used to generate transformation instructions for the master page. In one embodiment, the page module 102 may further associate the transformation instructions for the master page with the page layout.

At operation 216, an interface 110 may receive the transformation instructions for the master page. When the transformation instructions are received, the transformation module 108 may apply a transformation associated with the transformation instructions to the master page at operation 218. The layout module 106 may then output, for example, to a display (e.g., display device 118) the page layout incorporating graphical elements of the transformed master page.

Figure 3:
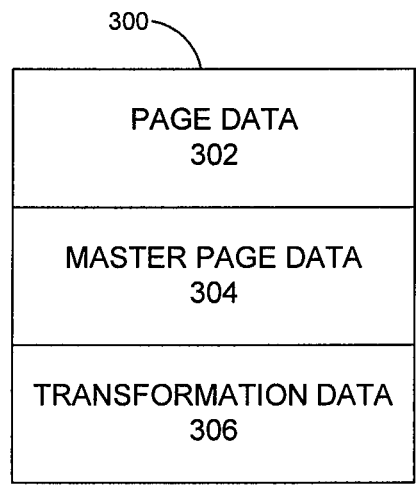
FIG. 3 is a block diagram illustrating a page data object, according to various embodiments.

FIG. 3 is a block diagram illustrating a page data object 300, according to various embodiments. The page data object 300 may include page data 302, master page data 304, and transformation data 304. The page data 302 may include layout data for a page layout, graphical elements belonging to the page layout, and other data associated with the page layout. The master page data 304 may include a reference to one or more master pages to be applied to the page layout.

The transformation data 306 may comprise data, such as transformation instructions, associated with one or more transformations for each master page to be applied to the page layout. Additionally, transformation data may include signals generated from user interactions with the master page overlay, as well as scripts. The transformation data 306 may also include a reference to the master page on which the transformations operate. In one embodiment, however, the transformation data 306 includes references to one or more transformations stored elsewhere. In another embodiment, the transformation data 306 and the transformation instructions included in the transformation data 306 may include position data that corresponds with a position where the master page overlay is to be displayed on its associated page layout. For example, the position data may indicate a default or standard position. In some embodiments, the default or standard position corresponds with an identity transformation in which the master page is applied entirely on the page layout. In this scenario, transformation data 306 may be initialized with default transformation instructions such as instructions associated with the identity transformation.

Figure 4:
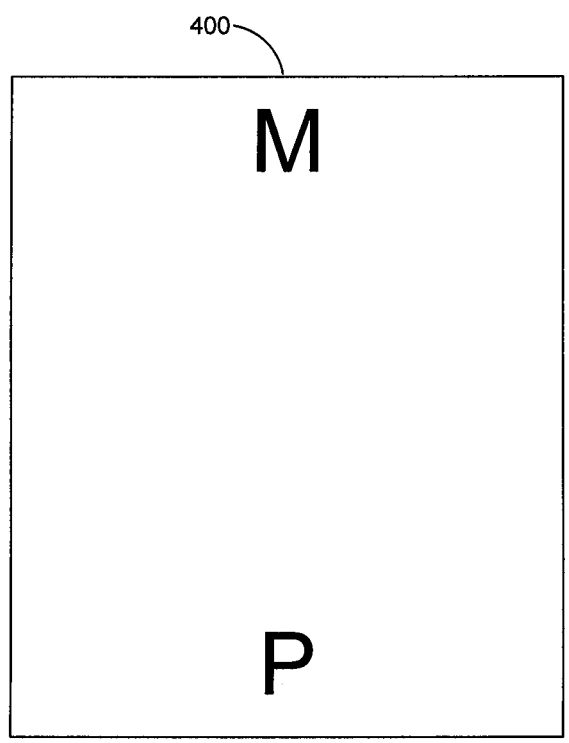
FIG. 4 is a block diagram illustrating a master page, according to various embodiments.

FIG. 4 is a block diagram illustrating a master page 400, according to various embodiments. The master page 400 may include one or more graphical elements. In other embodiments, however, the master page 400 may be empty or may not have graphical elements associated with it. In FIG. 4, the master page 400 is shown with two visible graphical elements, an "M" at the top of the master page 400 and a "P" at the bottom of the master page 400. The graphical elements in the master page 400 are arbitrary and used merely to illustrate certain details and embodiments discussed below. In one embodiment, the master page 400 has a defined size with defined dimension.

Figure 5:
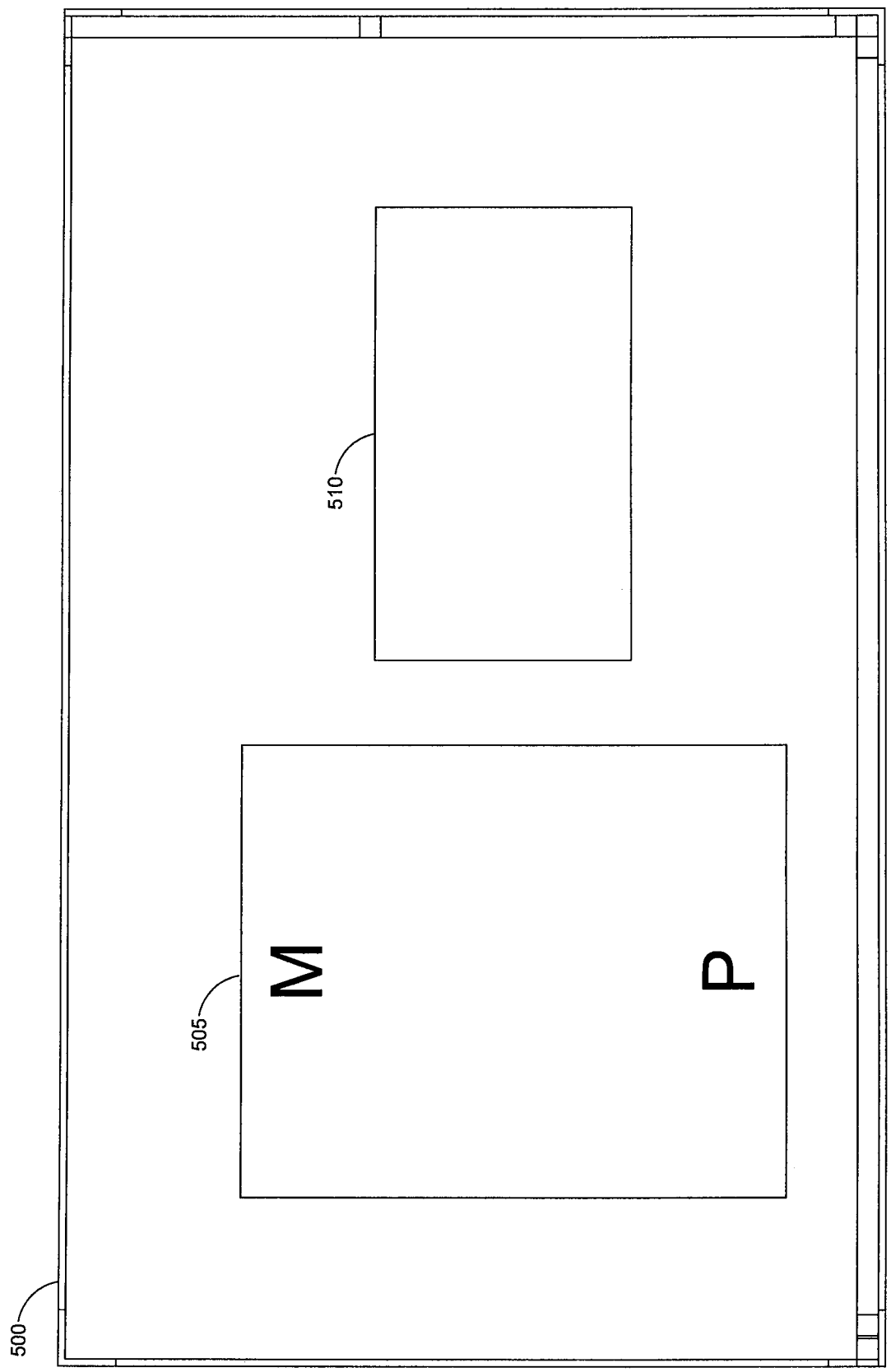
FIG. 5 is a block diagram illustrating a user interface displaying two pages, according to various embodiments.

FIG. 5 is a block diagram illustrating a user interface 500 displaying two page layouts 505 and 510, according to various embodiments. The user interface 500 may be a design application or page layout application that enables a user to create and modify page layouts as well as to apply the master pages to the page layouts. In one embodiment, the user interface 500 allows display and use of page layouts having different sizes. The sizes may be standard sizes or custom sizes. As can be seen in FIG. 5, in the user interface 500, the page layouts 505 and 510 are illustrated as different sizes. For example, the page layout 505 may be a standard or default size while the page layout 510 is smaller. In particular, the page layout 510 has the same width of the page layout 505, but a shorter length. Furthermore, the center of the page layout 510 is aligned (e.g., along an x-axis) with the center of the page layout 505. As a result, the top of the page layout 510 is not aligned with the top of the page layout 505, and the bottom of the page layout 510 is not aligned with the bottom of page layout 505. In other embodiments, a top, bottom, center, or arbitrary alignment is allowed. In FIG. 5, the page layouts 505 and 510 are shown not containing any graphical elements of their own. Instead, the graphical elements ("M" and "P") are shown in user interface 500 by virtue of having master page 400 applied to the page layouts 505 and 510. This is done so as to avoid obscuring the specification, however, in various embodiments, page layouts may include their own graphical elements.

A user creating or designing layouts for more than one page layout of different sizes may wish to apply the same master page instead of creating a new master page for each page layout size. Furthermore, a user may wish to apply the master page in different manners to different page layouts. For example, in the user interface 500, both of the page layouts 505 and 510 are associated with the same master page (e.g., the master page 400 illustrated in FIG. 4). The page layout 505 is shown incorporating the graphical elements (e.g., "M" and "P") of the master page 400. The page layout 510, on the other hand, does not show any of the graphical elements of the master page 400 because the size and position of the page layout 510 is such that the graphical elements ("M" and "P") of master page 400 do not show up on the page layout 510 when master page 400 is at the standard or default position. A user may wish to move or resize the master page overlay on the page layout 510 so that one or both of the graphical elements ("M" and "P") of the master page 400 show on the page layout 510. To do so, a user may activate the master page overlay.

Figure 6:
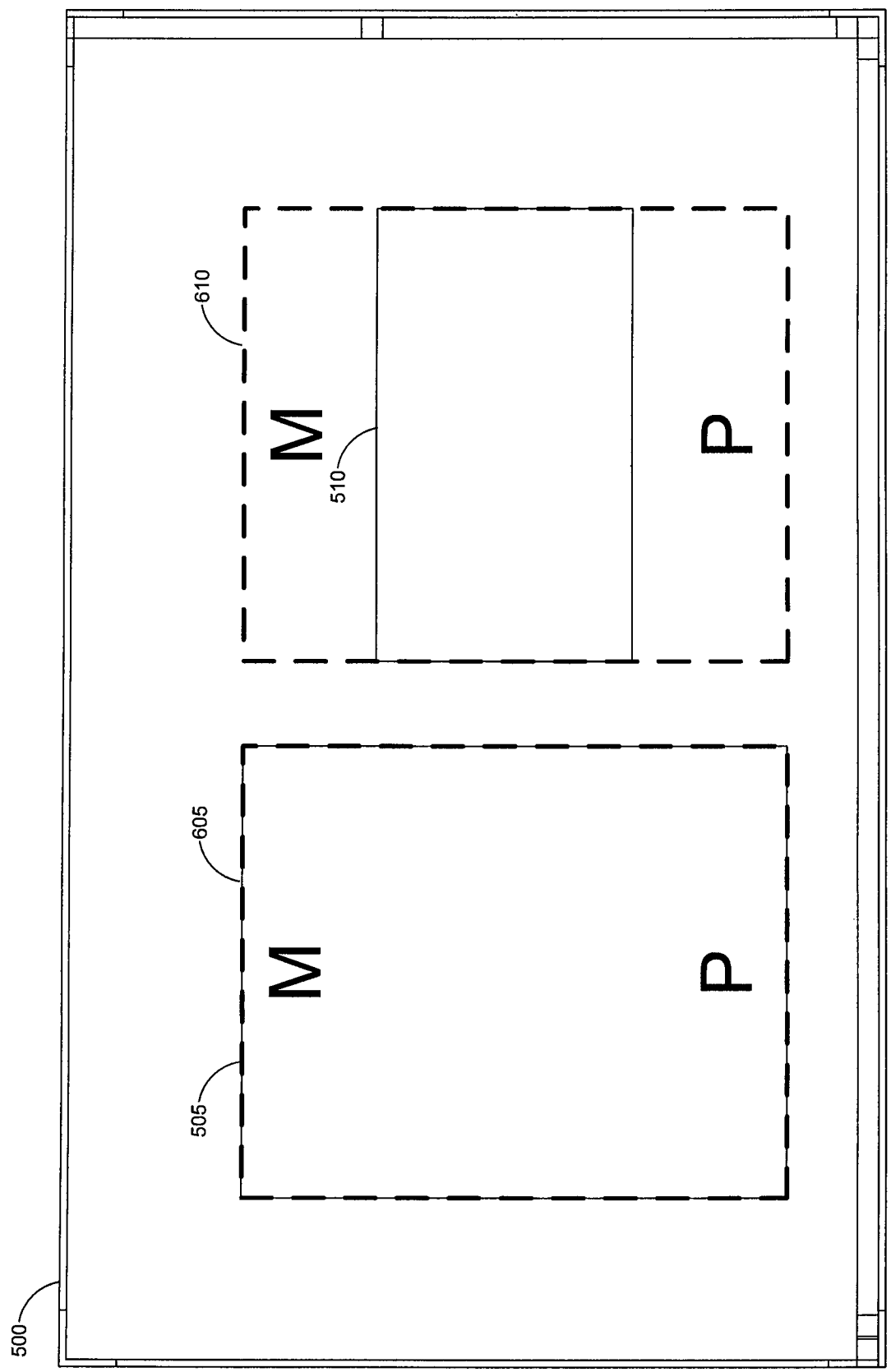
FIG. 6 is a block diagram illustrating a user interface displaying two pages with master page overlays, according to various embodiments.

As discussed above, the user interface 500 may provide a button, command, or interface (not shown in FIG. 5) to enable a user to activate the master page overlay. In response to receiving an activation of the button or command from a user, the user interface 500 may display the master page overlay. FIG. 6 is a block diagram illustrating the user interface 500 displaying the two page layouts 505 and 510 with master page overlays 605 and 610, according to various embodiments. The master page overlays 605 and 610 are shown in bold dotted lines in FIG. 6, however, in other embodiments, they may be identified using any manner that can be recognized (e.g., shading, color coding, labeling, etc.). The master page overlays 605 and 610 are displayed at a default position with respect to the page layouts 505 and 510. In FIG. 6, the master page overlay 605 is associated with the page layout 505, and the master page 610 is associated with the page layout 510. The master page 605 and page layout 505 may also be associated with a transformation of the master page 605, and the master page 610 and page layout 510 may be associated with a transformation of the master page 610. For example, both transformation of the master page 605 and transformation of the master page 610 may be an identity transformation.

In FIG. 6, the master page 400 associated with the master page overlay 610 is of a different size than its associated page layout 510. As a result, the graphical elements (e.g., "M" and "P") of the master page 400 are shown in the master page overlay 610 as not being positioned on the page layout 510. Alternatively, the master page overlay 610 may not display the graphical elements ("M" and "P") of the master page 400 because the graphical elements are not considered valid or eligible to be shown until the master page overlay 610 is positioned in such a way that one of the graphical elements is visible on the page layout 510.

A user may interact with the master page overlay 605 or 610 to generate transformation instructions for the master page 400. For example, the user may select the master page overlay 610 and drag and drop the master overlay 610 at a desired position (e.g., where a top of the master overlay 610 is aligned with a top of page layout 510). Alternatively, the user may select an "Align Top" command from a button or menu or run a script that aligns the top of the master overlay 610 with the top of page layout 510.

Figure 7:
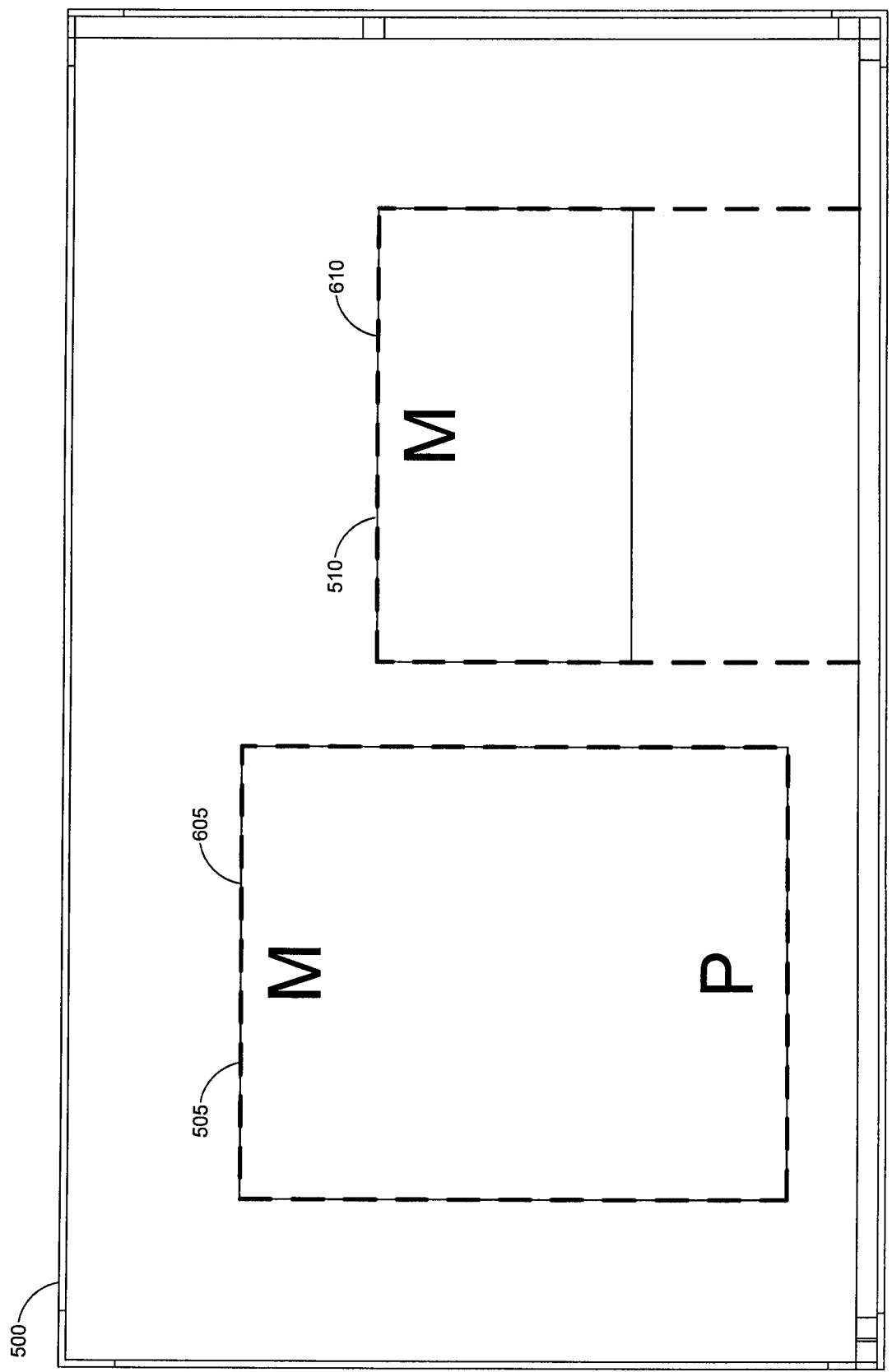
FIG. 7 is a block diagram illustrating a user interface displaying two pages with master page overlays, according to various embodiments.

FIG. 7 shows the user interface 500 after a user interacts with the master page overlay 610 which displays the page layouts 505 and 510 with the master page overlays 605 and 610, according to one embodiment. FIG. 7 illustrates a result of the user interacting with the master page overlay 610 to generate transformation instructions associated with the master page 400. For example, the result of the user dragging the master page overlay 610 downward is shown such that the top of the master page overlay 610 is aligned with the top of page layout 510. As a result, the master page overlay 605 and page layout 505 may still be associated with an identity transformation of the master page 400, while the master page overlay 610 and page layout 510 are now associated with transformation instructions that shift or translate the master page overlay 610 downward with respect to the page layout 510 such that the top of the master page overlay 610 is aligned with the top of the page layout 510. The dragging of the master page overlay 610 downward may be associated with signals that are received or detected and used to generate transformation instructions for the master page 610. These transformation instructions may be stored or referenced in the transformation data 306 of the page data object 300 by the page module 102. The transformation instructions may also be applied to the master page 610 by the transformation module 108, and the result may be outputted, for example, by rendering the page layout 510 incorporating the transformed graphical elements of the master page 610 on a display.

Similarly, other user interactions with the master page overlay (e.g., resizing the master page overlay, rotating the master page overlay, or applying other changes to the master page overlay via buttons, menu commands, tool palettes, etc.) may also generate signals that are received and used to generate transformation instructions for the master page overlay. The transformation instructions may be stored or referenced in the transformation data 306 of the page data object 300 by the page module 102. The transformation instructions may also be applied to the master page by the transformation module 108, and the result may be outputted, for example, by sending the page layout incorporating the translated graphical elements of the master page to a printer or printer interface. In another embodiment, a user may also select a script comprising transformation instructions.

Figure 8:
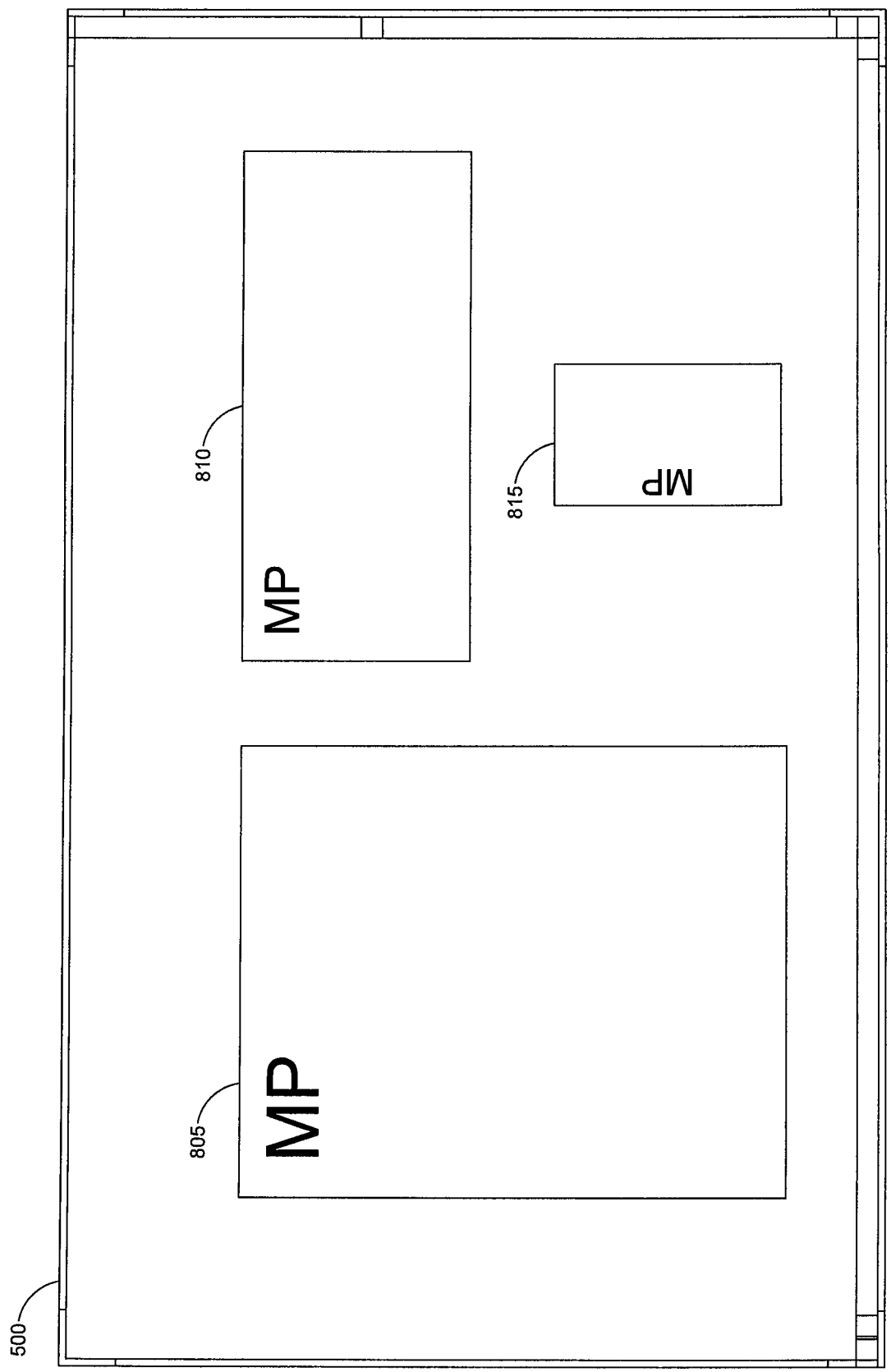
FIG. 8 is a block diagram illustrating a user interface displaying three pages incorporating graphical elements from a master page, according to various embodiments.

FIG. 8 is a block diagram illustrating the user interface 500 displaying three page layouts 805, 810, and 815 incorporating graphical elements from a master page, according to various embodiments. All three page layouts 805, 810, and 815 apply the same master page, where the master page has the graphical element "MP." Furthermore, all three page layouts 805, 810, and 815 are of different sizes, and may represent three different standard sizes. For example, the page layout 805 may be a standard page size, the page layout 810 may be a standard envelope size, and the page layout 815 may be a standard business card size. In other embodiments, one or more of the page layouts may be a custom size.

A user may wish to put the same graphical element (e.g., a company logo) on all three page layouts 805, 810, and 815. Instead of creating three different master pages, a user can apply the same master page that has the graphical element to all three page layouts 805, 810, and 815 and modify the way the master page is applied to each of the three page layouts 805, 810, and 815. For example, the page layout 805 may be associated with an identity transformation of the master page, the page layout 810 may be associated with a transformation of the master page that shrinks, and the page layout 810 may be associated with a transformation that shrinks, shifts, and rotates the master page. The transformation instructions associated with the three page layouts 805, 810, and 815 may have been generated using received scripts or signals generated from user interactions with one or more master page overlays (not shown in FIG. 8). In FIG. 8, the outputted page layout incorporating the graphical elements from the transformed master page is shown.

Figure 9:
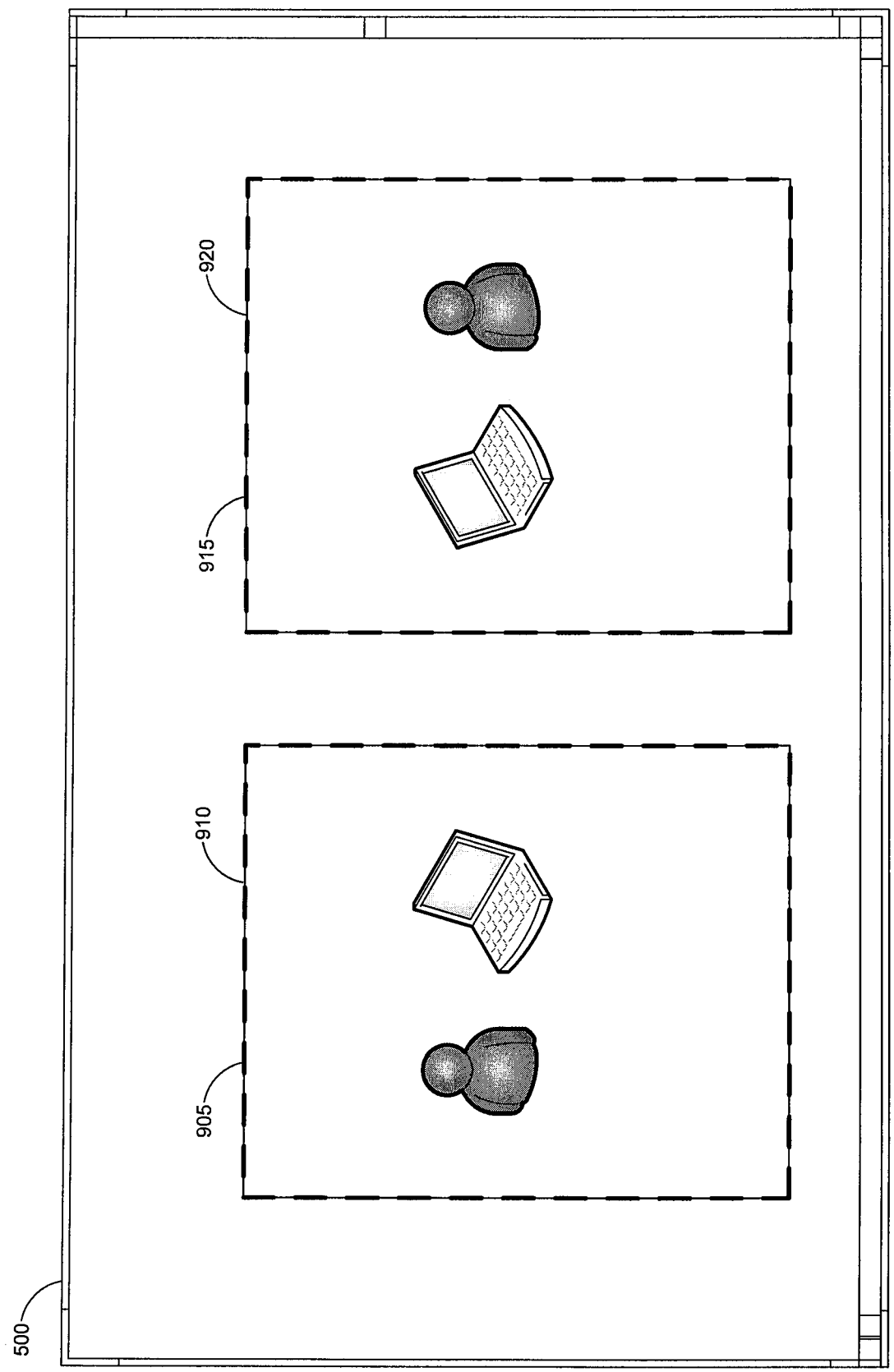
FIG. 9 is a block diagram illustrating an example user interface displaying two pages with master page overlays.

In some embodiments, a user may wish to modify the application of the master page to one or more page layouts even if the page layouts (or a page layout and a master page) are the same size. For example, FIG. 9 is a block diagram illustrating the user interface 500 displaying two page layouts 905 and 915 with master page overlays 910 and 920, according to one embodiment. The page layouts 905 and 915 are the same size, and both page layouts 905 and 915 apply the same master page, where the master page has graphical elements (e.g., a note book and a man). However, in the page layout 915, the master page overlay 920 is flipped or reflected about a vertical axis. As a result, the transformation of the master page associated with the page layout 915 may be associated with transformation instructions that flips or reflects the master page about a vertical axis. The transformation instructions associated with the page layouts 905 and 915 may have been generated using received scripts or transformation data from signals generated from user interactions with one or more master page overlays.

In some embodiments, a user is enabled to customize the application of the master page to one or more page layouts. Each page layout may have its own customized transformation of the master page. In such a way, a user is allowed more flexibility and control in using master pages and is able to use master pages in many more scenarios.

Figure 10:
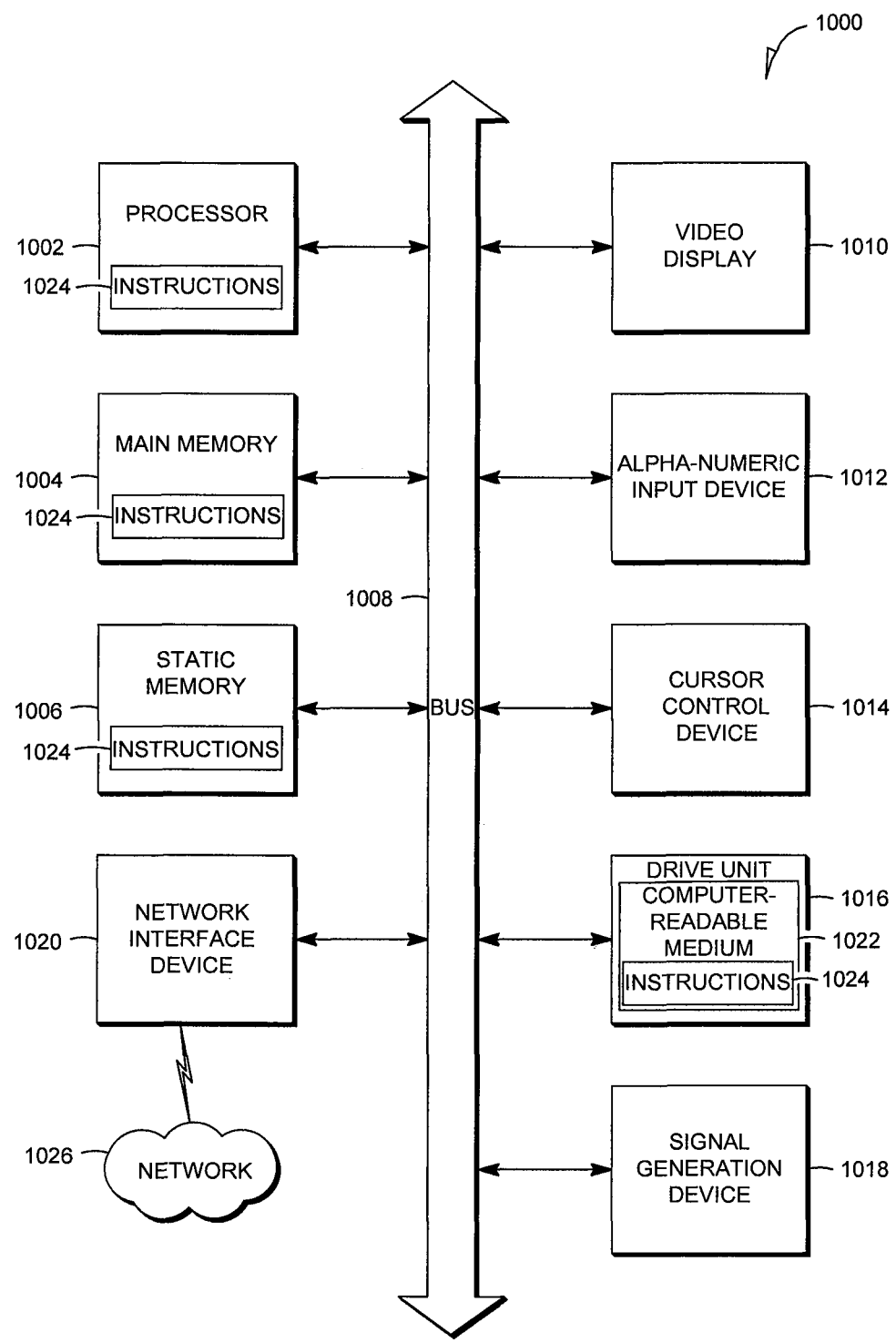
FIG. 10 is a simplified block diagram of a machine in the example form of an apparatus within which a set of instructions, for causing the machine to perform any one or more of the methodologies discussed herein, may be executed.

FIG. 10 is a simplified block diagram of a machine in the example form of an apparatus within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU) a graphics processing unit (GPU) or both), a main memory 1004 and a static memory 1006, which communicate with each other via a bus 1008. The computer system 1000 may further include a video display unit 1010 (e.g., a liquid crystal display (LCD) or a cathode ray tube (CRT)). The computer system 1000 also includes an alphanumeric input device 1012 (e.g., a keyboard), a cursor control device 1014 (e.g., a mouse), a disk drive unit 1016, a signal generation device 1018 (e.g., a speaker) and a network interface device 1020.

The disk drive unit 1016 includes a machine-readable storage medium 1022 on which is stored one or more sets of instructions (e.g., software 1024) embodying any one or more of the methodologies or functions described herein. The software 1024 may also reside, completely or at least partially, within the main memory 1004 and/or within the processor 1002 during execution thereof by the computer system 1000, the main memory 1004 and the processor 1002 also constituting machine-readable media. The software 1024 may further be transmitted or received over a network 1026 via the network interface device 1020.

While the machine-readable storage medium 1022 is shown in an example embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing, encoding or carrying a set of instructions for execution by the machine and that cause the machine to perform any one or more of the methodologies of the present invention. The term "machine-readable storage medium" shall accordingly be taken to include, but not be limited to, solid-state memories, optical and magnetic media, and carrier wave signals.

In some instances, methods, apparatuses or systems that would be known by one of ordinary skill have not been described in detail so as not to obscure claimed subject matter. Some portions of the detailed description which follow are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

Thus, methods and systems to select an object in a graphical user interface have been described. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

Additionally, certain embodiments described herein may be implemented as logic or a number of modules, engines, components, or mechanisms. A module, engine, logic, component, or mechanism (collectively referred to as a "module") may be a tangible unit capable of performing certain operations and configured or arranged in a certain manner. In certain example embodiments, one or more computer systems (e.g., a standalone, client, or server computer system) or one or more components of a computer system (e.g., a processor or a group of processors) may be configured by software (e.g., an application or application portion) or firmware (note that software and firmware can generally be used interchangeably herein as is known by a skilled artisan) as a module that operates to perform certain operations described herein.

In various embodiments, a module may be implemented mechanically or electronically. For example, a module may comprise dedicated circuitry or logic that is permanently configured (e.g., within a special-purpose processor, application specific integrated circuit (ASIC), or array) to perform certain operations. A module may also comprise programmable logic or circuitry (e.g., as encompassed within a general-purpose processor or other programmable processor) that is temporarily configured by software or firmware to perform certain operations. It will be appreciated that a decision to implement a module mechanically, in the dedicated and permanently configured circuitry, or in temporarily configured circuitry (e.g., configured by software) may be driven by, for example, cost, time, energy-usage, and package size considerations.

Accordingly, the term module should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time.

Modules can provide information to, and receive information from, other modules. Accordingly, the described modules may be regarded as being communicatively coupled. Where multiples of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices and can operate on a resource (e.g., a collection of information).

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A computer-implemented method comprising:
    receiving a user interaction with a graphical element on a master page overlay on a page, wherein a default state of the graphical element is inherited onto the master page overlay from a master page;
    based on receiving the user interaction, altering the graphical element on the master page overlay from the default state to an altered state;
    based on the user interaction with the graphical element on the master page overlay, generating transformation instructions comprising one or more functions that operate to manipulate the graphical element on the master page overlay to recreate the graphical element in the altered state from the default state of the master page;
    storing the transformation instructions on a memory device;
    accessing the transformation instructions associated with the page;
    accessing master page data of the master page, wherein the master page data comprises the graphical element in the default state;
    manipulating the graphical element on the master page overlay to the altered state from the default state by executing the one or more functions of the transformation instructions on the master page data, wherein the transformation instructions are applicable to generate the graphical element in the altered state from the default state of the master page; and
    causing display of the page, the page comprising the graphical element in the altered state.

2. The computer-implemented method of claim 1, wherein the transformation instructions are stored as a script comprising the one or more functions written in a scripting language.

3. The computer-implemented method of claim 1, wherein the page displays the graphical element in the master page overlay, wherein the master page overlay displays each of a plurality of graphical elements in the master page in a visually distinguishable manner from each of a plurality of graphical elements in the page based on manipulating the plurality of graphical elements in the page using the transformation instructions.

4. The computer-implemented method of claim 1, wherein the user interaction comprises a user dragging the graphical element from a first location to a second location, wherein the dragging results in manipulating the graphical element from the default state to the altered state.

5. The computer-implemented method of claim 1, wherein the one or more functions manipulate the graphical element, the manipulations comprising altering a color, a hue, a size, and an orientation of the graphical element, wherein the altering manipulates the graphical element from the default state to the altered state.

6. The computer-implemented method of claim 1, wherein storing the transformation instructions stores an association between the transformation instructions and the page, and the accessing is performed based on identifying the association.

7. The computer-implemented method of claim 1, further comprising, after storing the transformation instructions, causing display of a different page, the different page comprising another master page overlay including the graphical element displayed in the default state, wherein the default state of the graphical element is inherited from the master page.

8. The computer-implemented method of claim 7, further comprising after storing the transformation instructions:
    accessing other transformation instructions stored on the memory device with the transformation instructions, the accessing being in association with the different page, the other transformation instructions comprising one or more different functions that are applicable to generate a different altered state of the graphical element from the default state of the master page;
    accessing the master page data of the master page, wherein the master page data comprises the graphical element in the default state;
    manipulating the graphical element to recreate the different altered state of the graphical element from the default state of the master page by executing the one or more different functions of the other transformation instructions on the master page data, wherein the different altered state comprises the graphical element in the different altered state; and
    causing display of the different page, the different page comprising the graphical element in the different altered state.

9. The computer-implemented method of claim 1, wherein the page that comprises the graphical element in the altered state is displayed in a user interface.

10. The computer-implemented method of claim 1, herein the one or more functions describe manipulations of the graphical element on the master page overlay.

11. The computer-implemented method of claim 1, wherein the one or more functions comprise steps for manipulating the graphical element to the altered state from the default state.

12. A computer-implemented system comprising computer memory comprising instructions, which when executed by one or more processors, cause the one or more processor to perform operations comprising:

receiving a user interaction with a graphical element on a master page overlay on a page, wherein a default state of the graphical element is inherited onto the master page overlay from a master page;

based on receiving the user interaction, altering the graphical ent on the master page overlay from the default state to an altered state;

based on the user interaction with the graphical element on the master page overlay, generating transformation instructions comprising one or more functions that operate to manipulate the graphical element on the master page overlay to recreate graphical element in the altered state from the default state of the master page;

storing the transformation instructions on a memory device;

accessing the transformation instructions associated with the page;

accessing master page data of the master page, wherein the master page data comprises the graphical element in the default state;

manipulating the graphical element on the master page overlay to the altered state from the default state by executing the one or more functions of the transformation instructions on the master page data, wherein the transformation instructions are applicable to generate the graphical element in the altered state from the default state of the master page; and causing display of the page, the page comprising the graphical element in the altered state.

13. The computer-implemented system of claim 12, wherein the transformation instructions are stored as a script comprising the one or more functions written in a scripting language.

14. The computer-implemented system of claim 12, wherein the page displays the graphical element in the master page overlay, wherein the master page overlay displays each of a plurality of graphical elements in the master page in a visually distinguishable manner from each of a plurality of graphical elements in the page based on manipulating the plurality of graphical elements in the page using the transformation instructions.

15. The computer-implemented system of claim 12, wherein the user interaction comprises a user dragging the graphical element from a first location to a second location, wherein the dragging results in manipulating the graphical element from the default state to the altered state.

16. A non-transitory machine-readable storage medium comprising instructions, which when executed by one or more processors, cause one or more machines to perform operations comprising:

receiving a user interaction with a graphical element on a master page overlay on a page, wherein a default state of the graphical element is inherited onto the master page overlay from a master page;

based on receiving the user interaction, altering the graphical element on the master page overlay from the default state to an altered state;

based on the user interaction with the graphical element on the master page overlay, generating transformation instructions comprising one or more functions that operate to manipulate the graphical element on DTI the master page overlay to recreate the graphical element in the altered state from the default state of the master page;

storing the transformation instructions on a memory device;

accessing the transformation instructions associated with the page;

accessing master page data of the master page, wherein the master page data comprises the graphical element in the default state;

manipulating the graphical element on the master page overlay to the altered state from the default state by executing the one or more functions of the transformation instructions on the master page data, wherein the transformation instructions are applicable to generate the graphical element in the altered state from the default state of the master page; and causing display of the page, the page comprising the graphical element in the altered state.

17. The machine-readable storage medium of claim 16, wherein the transformation instructions are stored as a script comprising the one or more functions written in a scripting language.

18. The machine-readable storage medium of claim 16, wherein the page displays the graphical element in the master page overlay, wherein the master page overlay displays each of a plurality of graphical elements in the master page in a visually distinguishable manner from each of a plurality of graphical elements in the page based on manipulating the plurality of graphical elements in the page using the transformation instructions.

19. The machine-readable storage medium of claim 16, wherein the user interaction comprises a user dragging the graphical element from a first location to a second location, wherein the dragging results in manipulating the graphical element from the default state to the altered state.

20. The machine-readable storage medium of claim 16, wherein the one or more functions manipulate the graphical element, the manipulations comprising altering a color, a hue, a size, and an orientation of the graphical element, wherein the altering manipulates the graphical element from the default state to the altered state.

* * * * *

UNITED STATES PATENT AND TRADEMARK OFFICE
CERTIFICATE OF CORRECTION

| | |
|---|---|
| PATENT NO. | : 10,553,001 B2 |
| APPLICATION NO. | : 12/623188 |
| DATED | : February 4, 2020 |
| INVENTOR(S) | : Shawn C. Sheridan et al. |

It is certified that error appears in the above-identified patent and that said Letters Patent is hereby corrected as shown below:

On the Title Page

In Column 2, item (56), Other Publications, Line 2, delete "CreaivePro.com," and insert -- CreativePro.com --, therefor.

In the Claims

In Column 12, Line 57, Claim 10, delete "herein" and insert -- wherein --, therefor.

In Column 13, Line 6, Claim 12, delete "ent" and insert -- element --, therefor.

In Column 14, Line 9 (approx.), Claim 16, after "on" delete "DTI".

Signed and Sealed this
Twelfth Day of May, 2020

Andrei Iancu
*Director of the United States Patent and Trademark Office*